United States Patent
Cline et al.

(10) Patent No.: US 6,923,405 B2
(45) Date of Patent: Aug. 2, 2005

(54) ENHANCED RUDDER CONTROL SYSTEM

(75) Inventors: Paul J. Cline, Bothell, WA (US); Neal V. Huynh, Bellevue, WA (US); Leonard J. Inderhees, Snohomish, WA (US); Munior Orgun, Woodinville, WA (US); Mark H. Smith, Vashon, WA (US); Alexander Craig Oleson, Edmonds, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 10/714,744

(22) Filed: Nov. 17, 2003

(65) Prior Publication Data

US 2005/0116095 A1 Jun. 2, 2005

(51) Int. Cl.$^7$ ............................................. B64C 13/42
(52) U.S. Cl. ........................ 244/75 R; 244/78; 244/195
(58) Field of Search ................................ 244/75 R, 78, 244/76 R, 194–196; 91/367, 438; 60/456, 60/388

(56) References Cited

U.S. PATENT DOCUMENTS

| | | | | |
|---|---|---|---|---|
| 2,705,940 A | * | 4/1955 | Edwards ....................... | 91/367 |
| 3,633,435 A | * | 1/1972 | Farr ............................ | 74/470 |
| 3,679,156 A | * | 7/1972 | Redmond, Jr. ............... | 244/194 |
| 3,683,749 A | * | 8/1972 | Bayles ........................ | 91/438 |
| 3,902,318 A | * | 9/1975 | Becker et al. ................ | 60/388 |
| 4,759,515 A | * | 7/1988 | Carl ........................... | 244/76 R |
| 4,964,599 A | * | 10/1990 | Farineau ..................... | 244/195 |
| 5,074,495 A | * | 12/1991 | Raymond .................... | 244/78 |
| 5,109,672 A | * | 5/1992 | Chenoweth et al. .......... | 60/456 |
| 6,241,182 B1 | * | 6/2001 | Durandeau et al. ....... | 244/75 R |

\* cited by examiner

*Primary Examiner*—Galen Barefoot
(74) *Attorney, Agent, or Firm*—Harness, Dickey & Pierce, PLC (57) ABSTRACT

A reliably redundant PCU for an aircraft. The PCU includes an override mechanism coupled to the aircraft's control path and a first control member coupled to the override mechanism whereby the override mechanism attempts to transmit a command from the command path to the first control member. The unit also includes a second control member coupled to the control path whereby the command path transmits the command to the second control member. Additionally, the PCU includes two actuator members coupled to the control members whereby the actuator members attempt to move in response to the command. If the first control member resists moving the override mechanism allows the second control member to actuate the rudder. The PCU also includes a common actuator coupled to the actuator members and the control surface, whereby the actuator moves the control surface. Moreover, a unitary housing contains the first and the second actuator members.

12 Claims, 9 Drawing Sheets

ENHANCED RUDDER CONTROL SYSTEM

FIELD OF THE INVENTION

The present invention relates to actuation systems for aircraft control surfaces, and more particularly to a reliably redundant control system for an aircraft rudder.

BACKGROUND OF THE INVENTION

In the aviation industry a requirement exists that certain control systems be reliably redundant. For components (and systems) required for safe takeoff and landing, reliably redundant means that failures of redundant components may not be latent. Failures must be patent, or detectable. Conversely, if a failure of one of the redundant components is latent, then the system fails to be reliably redundant. It will be understood by those skilled in the art that the requirement for reliable redundancy does not apply to structural components, and more particularly to load paths.

On most commercial aircraft, the captain and first officer control the control surfaces via two control sticks and two sets of rudder pedals. To control the rudder, in particular, the crew uses the two sets of rudder pedals. Both sets of rudder pedals are connected to the same single load path cable, which communicates the pilot inputs, or commands, to the aft cable quadrant and then input torque tube located at the aft end of the aircraft. The input torque tube, in turn, communicates with the feel and centering unit and trim actuator, a main power control unit and a standby power control unit. The main and standby power control units, which are directly connected to the rudder, utilize hydraulic pressure to move the rudder control surface against the air loads. The amount of hydraulic force used to move the surface via this hydro-mechanical arrangement is proportional to the air load acting on the rudder control surface.

Many commercial aircraft employ three full time, fully redundant, flight control systems so that, in the event of any combination of two simultaneous failures, the vehicle can be landed safely. Each redundant system, of course, adds weight and complexity to the vehicle. Moreover, because of the duplication of equipment, more failures are likely which tends to cause maintenance and unprofitable down time of the aircraft. Accordingly, it is desirable to provide a simple, lightweight flight control system. Yet it remains necessary to provide reliable redundancy.

SUMMARY OF THE INVENTION

The present invention is directed to a control system used to position an aerodynamic control surface (e.g. a rudder) of an aircraft. A power control unit of the present invention includes two pistons, or actuator members, coupled to the actuator for the rudder. These two pistons communicate with the hydraulic systems of the aircraft so that when the pilot commands the rudder, the hydraulic pressure assists the pilot in moving the rudder by acting on the pistons.

A second embodiment of the present invention includes a power control unit which includes two pistons, or actuator members, coupled to the actuator for the rudder. These two pistons communicate with the hydraulic systems of the aircraft so that when the pilot commands the rudder, the hydraulic pressure assists the pilot in moving the rudder by acting on the pistons. The main power control unit contains two independent redundant input paths, each path having an override mechanism, to limit the effect of a jam or disconnect in one input path to the power control unit. In addition, the power control unit may include two delta pressure sensors, each connected across a piston. A comparator compares the sensed delta pressures, thereby deriving a delta-delta pressure, and annunciating the situation as a problem if the delta-delta pressures differ by more than a predetermined amount. A standby system may also be engaged in order to provide continued normal control.

A third embodiment of the present invention includes a method of controlling an aircraft. In the method, attempts are made to move both pistons of a rudder power control unit. If either attempt is successful the rudder is actuated. While the attempts are made, the delta pressures across the pistons are monitored. If the two delta pressures differ by more than a predetermined amount, a failure of one side of the power control unit is annunciated. Additionally, the annunciation of the problem may activate a standby rudder actuator.

Further areas of applicability of the present invention will become apparent from the detailed description provided hereinafter. It should be understood that the detailed description and specific examples are intended for purposes of illustration only and are not intended to limit the scope of the invention.

BRIEF DESCRIPTION OF THE DRAWINGS

The present invention will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the invention, its application, or uses.

In a first preferred embodiment, the present invention includes a flight control system having only two power control units, two full time hydraulic systems and a standby hydraulic system. Yet the system of the present embodiment has the same capabilities as a prior art, triple redundant, force voting system having three power control units and three full time hydraulic systems. Moreover, the system per the present embodiment is lighter and cheaper than the prior art system and provides reliable redundancy.

The first preferred embodiment provides the following system level features. First, systems in accordance with the present embodiment may include two independent, mechanical, command, input paths including override mechanisms. Each input path controls a separate simplex control valve within the main power control unit. Thus, the present embodiment provides a system resistant to latent single slide jams and input arm jams. The main power control unit may also include two pistons, ports to the two independent hydraulic systems, and two actuators connected in tandem on a common centerline.

The two pistons may be positioned on a common centerline, in a dual tandem arrangement and may be driven by the two independent hydraulic systems of the aircraft. When the pilot commands the rudder, the hydraulic pressure assists the pilot in moving the rudder by acting on the pistons. The hydraulic pressure to each piston may be controlled by one of the single, independent simplex control valves. Each control valve is controlled by an independent mechanical input linkage connected to the input torque tube via an override mechanism. In the event of a jam of one of the simplex control valves, the override mechanism will allow continued operation of the other simplex control valve and the associated actuator member.

Additionally, a bleed orifice across each piston may also be provided to provide unconditional stability and to minimize force fight between the two tandem pistons. Such an embodiment thereby emulates structural compliance between the pistons, yet allows acceptable yaw damper performance from a dual tandem actuator arrangement. By minimizing force fight, the orifice also preserves the operational life time of the various components which might otherwise undergo fatigue.

Additionally, a preferred embodiment provides a means to indicate if a jam or disconnect of one of the input command paths has occurred, thereby providing reliable redundancy to the aircraft. The current embodiment includes a delta-delta pressure sensor within the main power control unit and which includes two delta pressures sensors and a comparator. One of the delta pressure sensors is connected across each piston of the main power control unit. The comparator compares the two sensed delta pressures and determines the difference between the sensed delta pressures. Hence the term delta-delta pressure monitor.

If the delta-delta pressure exceeds a predetermined amount, a standby power control unit may be activated and an annunciator may be illuminated in the flight deck. Thus the delta-delta pressure monitor of the present embodiment monitors the integrity of each independent mechanical command path of the main power control unit. In addition, activation of the standby power control unit by the delta-delta pressure monitor allows the pilots continued normal control of the aerodynamic surface via the provided reliable redundancy.

Moreover, internal to the main power control unit in the present embodiment, a shield is provided to preclude jams of both control valve input linkages due to a common foreign object. Moreover, the shield may provide a backup to the yaw damper manifold stops of the main power control unit. Furthermore the input arm manifold stops of the first preferred embodiment are internal to the power control unit. Thus the input arm manifold stops are resistant to being jammed by foreign objects or ice if it were to exist external to the main power control unit. Thus, aircraft which incorporate the present invention may require no pilot procedure to ensure a safe landing in the event of an input jam.

In accordance with the present embodiment, a standby power control unit may backup the main power control unit. The standby power control unit may feature one mechanical input path with an override mechanism, one simplex control valve, ports for connection to one hydraulic system, and one electro-mechanical input to the control valve. The standby power control unit may be provided for the rudder in particular and may be provided for other control surfaces as well.

Figure 1:
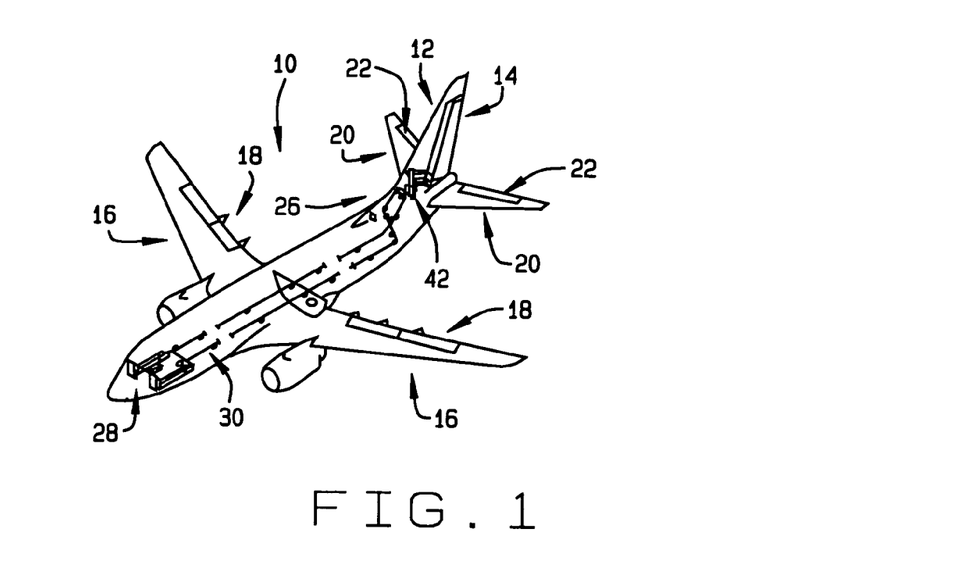
FIG. 1 is a perspective view of an aircraft in accordance with a preferred embodiment of the present invention.

With reference to FIG. 1, an aircraft 10 in accordance with a second preferred embodiment of the present invention is shown. The aircraft 10 includes a vertical tail 12 including a tail rudder 14. Also, the aircraft includes a pair of wings 16 including ailerons 18 and a stabilizer 20 including elevators 22. For clarity, the flaps, slats, and spoilers have not been shown. These control surfaces enable the aircraft 10 to maneuver, trim its aerodynamic performance to suit flight conditions, and respond to disturbances in the atmosphere around it.

For instance, when the pilot desires to control the yaw of the airplane 10, particularly during final approach and landing, he pushes on the appropriate rudder pedal to deflect the rudder. It should be noted that other sources for rudder commands generally exist on typical aircraft. For instance, the yaw damper or rudder trim switch may cause desired movement of the rudder 14. Regardless of the source of the command, as the rudder 14 pivots from its neutral position, the rudder deflects the air rushing by the aircraft thereby causing a reaction on the rudder 14. Because the reaction acts aft of the aircraft center of gravity the aircraft yaws as desired.

Figure 2:
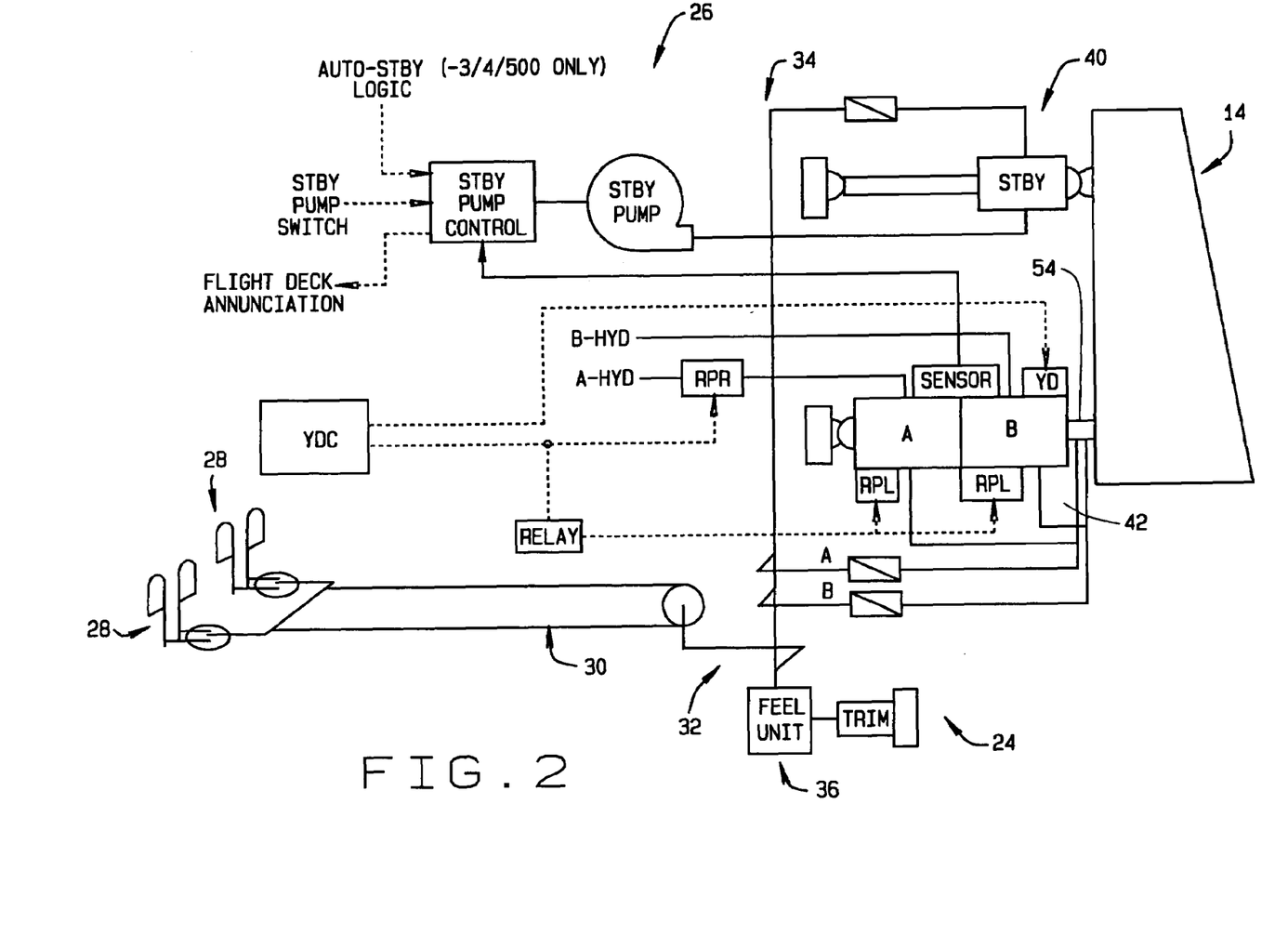
FIG. 2 is a block diagram of a flight control system in accordance with a preferred embodiment of the present invention.
Figure 3:
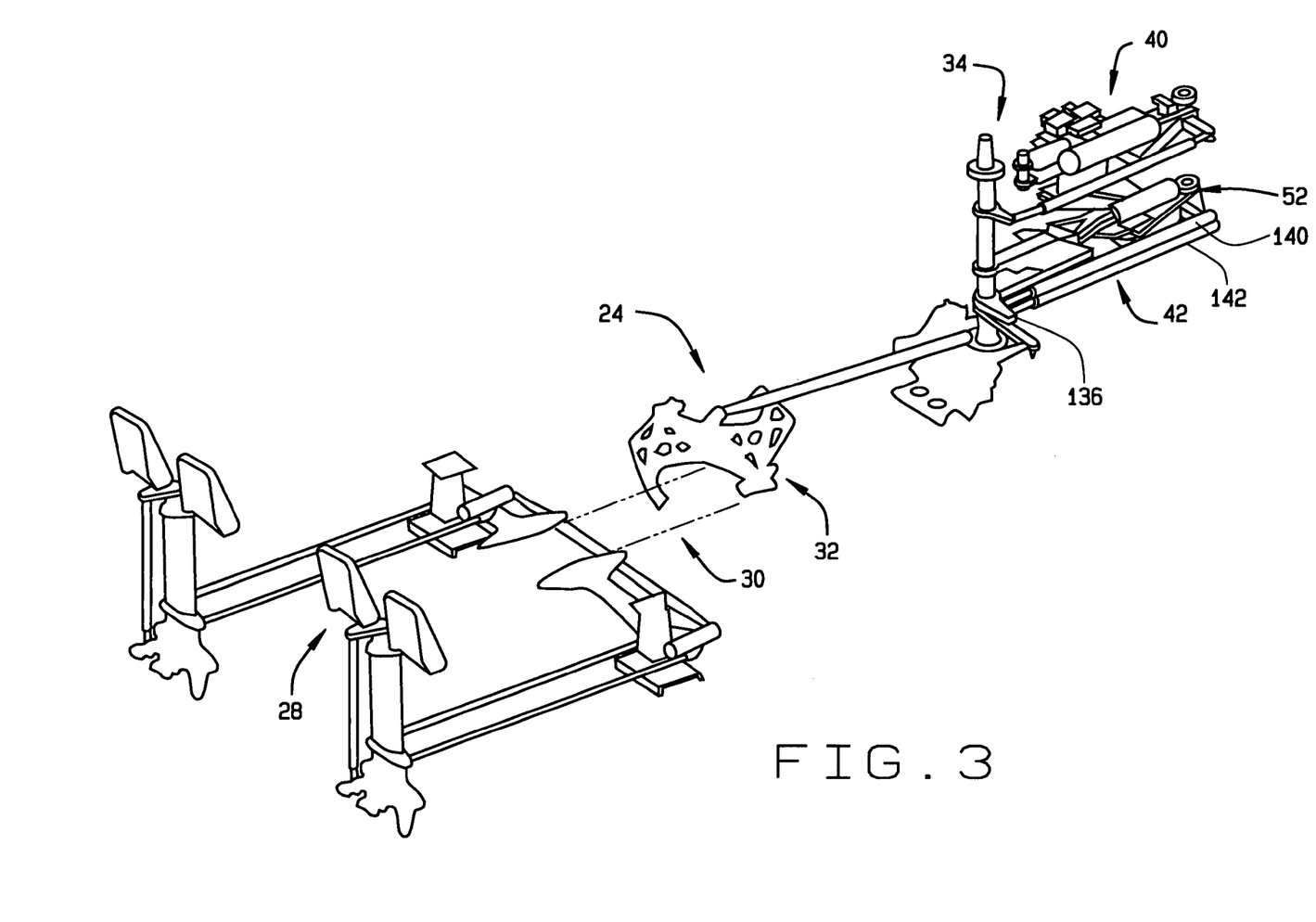
FIG. 3 is a perspective view of a flight control system in accordance with a preferred embodiment of the present invention.

FIGS. 2 and 3 show the mechanical subsystem 24 of a rudder control system 26 in accordance with a preferred embodiment of the present invention. While FIG. 2 shows a simplified block diagram of the mechanical subsystem 24, FIG. 3 shows a perspective view of the mechanical subsystem 24. In particular the figures show a mechanical subsystem associated with the rudder controls. The mechanical system 24 includes two sets of rudder pedals 28, a single load path cable, or common cable 30, an aft cable quadrant 32, an input torque tube 34, a feel and centering unit 36, a main power control unit 42 and a standby power control unit 40. The main and standby power control units 42 and 40, which are directly connected to the rudder 14, utilize hydraulic pressure to move the rudder against the air loads, and it does so in proportion to the control inputs received from either set of rudder pedals 28.

A main power control unit 42 in accordance with a preferred embodiment of the present invention may also be seen in relation to the aircraft 10 in FIG. 1. As can be seen, the single load path cable 30 couples the pedals 28 to the rudder 14 via the power control unit 42. It will be understood that the term single load path cable as used herein is not limited to single mechanical cables. Rather, typical control systems use various combinations of rigid links, mechanical cables, and even fly-by-wire (or fiber) systems to transmit commands from the pilot (and other command sources) to the power control units. In a manner to be described herein, the power control unit 42 transforms the rudder commands from the pilot into rudder 14 movements.

However, should a jam occur within the feedback loop of the input path to the power control unit, the jam could result in a hardover movement of the rudder 14. While the present invention is directed toward a reliably redundant control system to mitigate such scenarios, it will be understood that the present invention accommodates impeded rudder movement scenarios as well.

Figure 4:
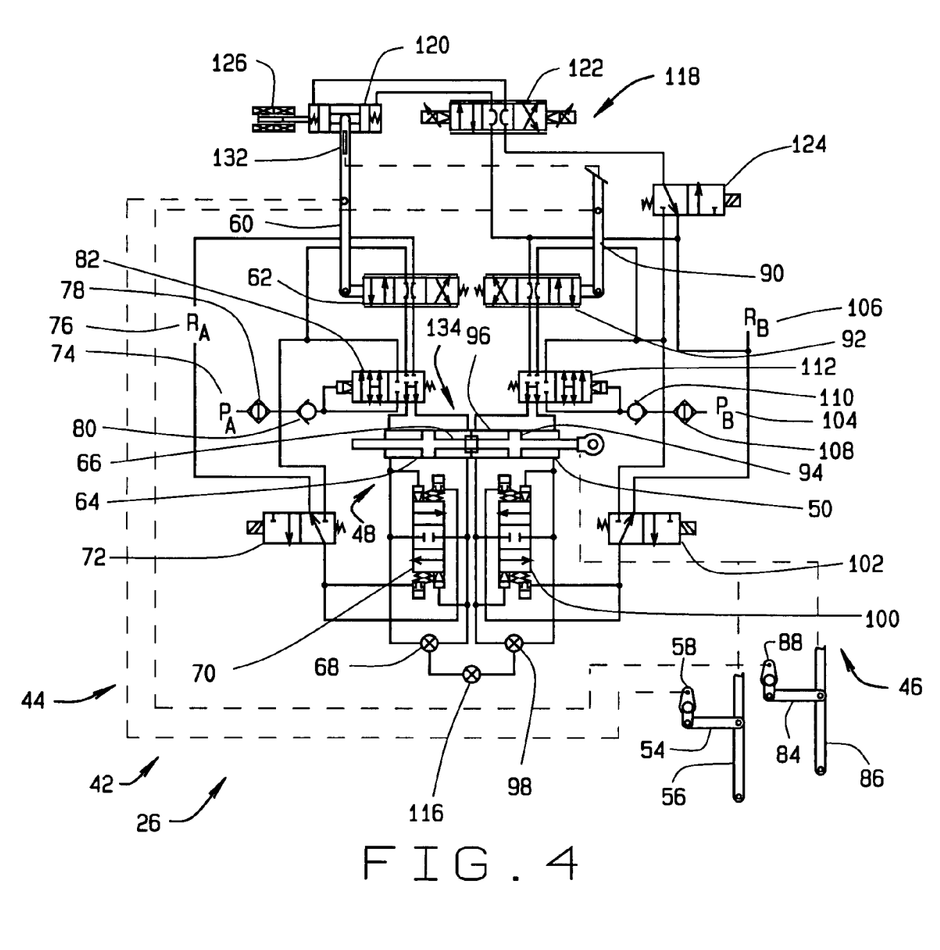
FIG. 4 is a schematic view of a flight control system in accordance with a preferred embodiment of the present invention.
Figure 5:
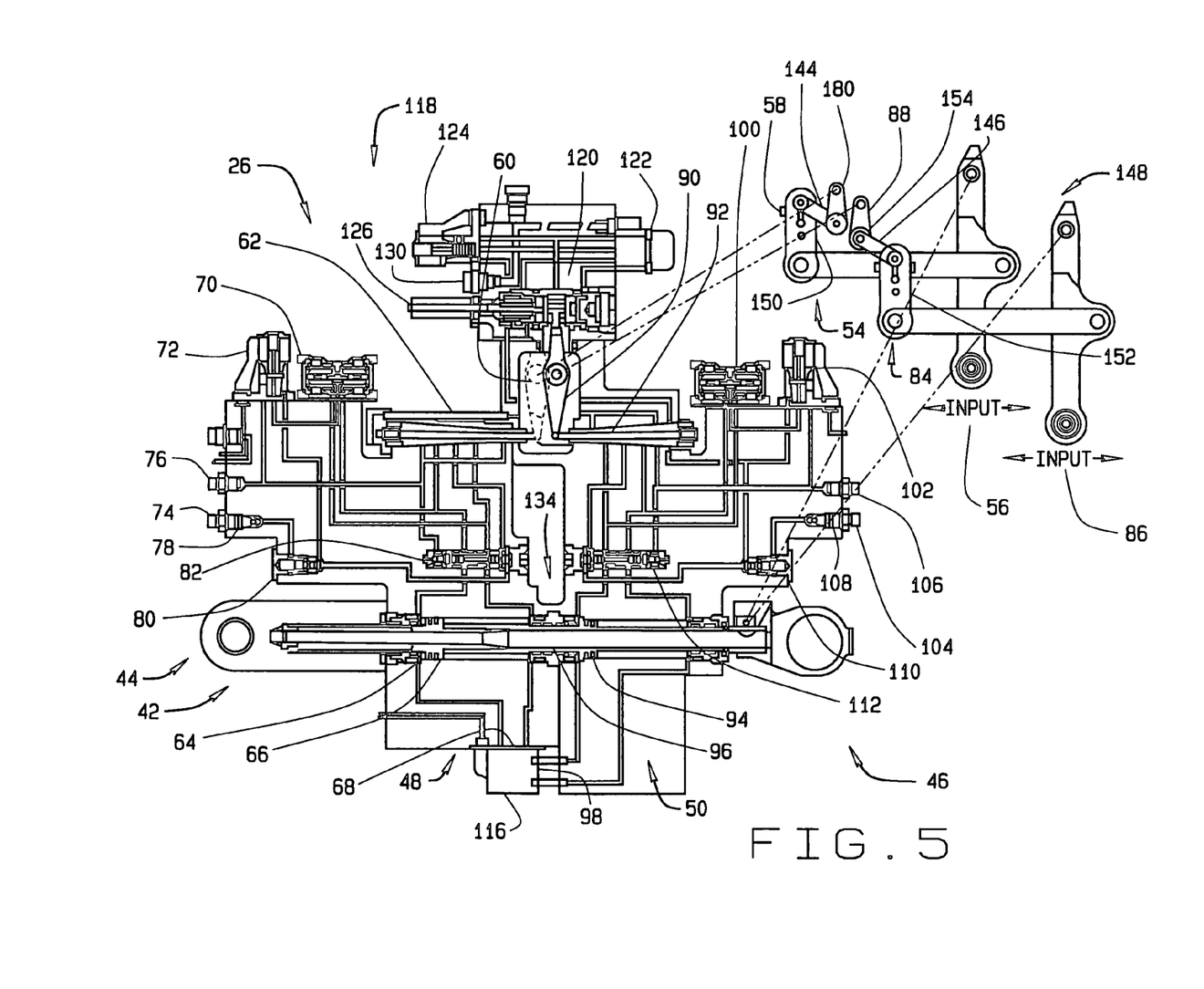
FIG. 5 is a schematic view of a flight control system in accordance with a preferred embodiment of the present invention.
Figure 6:
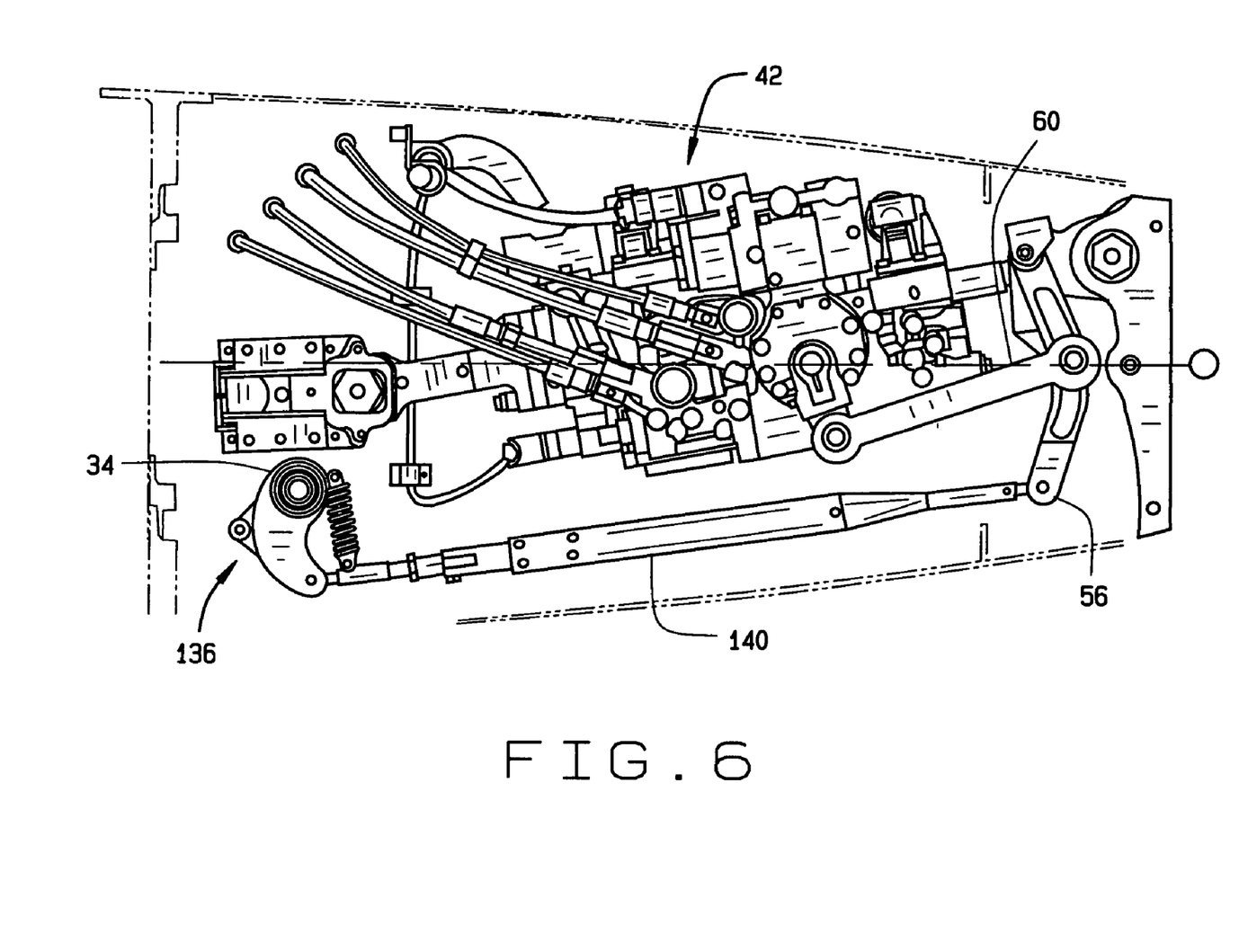
FIG. 6 is a top plan view of a dual tandem actuator in accordance with the principles of the present invention.

Turning now to FIGS. 4, 5, and 6, a reliably redundant power control unit 42 in accordance with the present invention is shown. The reliably redundant power control unit 42 may be divided into two halves. Typically, the halves are labeled as the A half 44 and the B half 46. Each half functionally represents a separate actuator, called the A actuator 48 and B actuator 50. In general, the components within the "B" actuator 50 duplicate components and functionality of the "A" actuator 48. However the A and B halves 48 and 50 are housed within a single, internally redundant, main power control unit housing 52. While the present invention is directed toward a tandem arrangement of the two halves, it will be understood that a parallel arrangement of the two halves may be used.

The main power control unit 42 is mechanically connected to the rudder 14 of the aircraft via a dual load path actuator. As the common actuator of the main power control unit 42 extends and retracts the rudder 14 pivots to the left and right, respectively, thereby controlling the aircraft 10. While the description of the invention uses the rudder 14 as an exemplary control surface, it will be understood that reference to the rudder 14 may refer to any control surface on the aircraft 10. Likewise, reference to the pedals 28 will be understood to refer to any crew control interface (e.g. the control stick and graphical user interface features).

Still with reference to FIGS. 4 and 5, some of the equipment which cooperates to cause the main power control unit 42 to move the rudder 14 will be described. The following equipment can be seen in the A half 44, of the main power control unit 42: an external summing lever 56, internal input crank stops 58, internal summing lever 60, a proportional control valve 62, an actuator piston 64, a dual load path actuator rod 66, a delta pressure sensor 68, a load limiter and cross port relief valve 70, a load limiter solenoid valve 72, a hydraulic pressure source 74, a hydraulic return 76, a hydraulic fluid filter 78, an inlet check valve 80, a bypass valve 82, and input linkage 54. Similarly, the following equipment can be seen in the B half 46, of the main power control unit 42: an external summing lever 86, internal input crank stops 88, internal summing lever 90, a simplex control valve 92, an actuator piston 94, a dual load path actuator rod 96, a delta pressure sensor 98, a load limiter and cross port relief valve 100, a load limiter solenoid valve 102, a hydraulic pressure source 104, a hydraulic return 106, a hydraulic fluid filter 108, an inlet check valve 110, a bypass valve 112, and input linkage 84.

Since the equipment in both halves 44 and 46 is similar it will be understood that reference to a component of "A" half 44 also refers to the corresponding component in "B" half 46. In addition to the components duplicated between the A and B halves 44 and 46, the power control unit 48 of the present invention may include several other components which are either common to the two halves or not necessarily included in both halves. For instance a comparator 116 couples to both halves 44 and 46. Whereas the components of a yaw damper subsystem 118 need not be associated with both halves 44 and 46. The yaw damper subsystem includes a yaw damper actuator 120, a yaw damper electro-hydraulic servo valve 122, a yaw damper solenoid valve 124, a yaw damper LVDT 126, and yaw damper relief valves 128 and 130. The yaw damper actuator 120 connects to the internal summing levers 60 and 90. Additionally, an orifice 138 (and 168 for B half 46) in the bypass valve 82 allows hydraulic fluid to bleed around the piston 64 to relieve force fight as will be discussed herein. (See FIG. 4).

The various components of the control system 26 will now be further described. First, the single load path cable 30 (seen in FIGS. 1 to 3) links the sets of rudder pedals 28 in the cockpit to the power control unit 42. The pilot (or copilot for B half 46) commands the rudder 14 by moving the rudder pedal 28. In turn the rudder pedal 28 moves the single load path cable which in turn commands the power control unit 42.

Referring still to FIGS. 4 and 5, the power control unit 42 also includes a dual tandem actuator 134 which includes two actuator members, or the hydraulic pistons 64 and 94. The pistons 64 and 94 couple to their respective actuator rods 66 and 96 on a common center line. The actuator rods 66 and 96 are coupled together in a dual tandem arrangement, which in turn couples to the rudder 14.

An override mechanism 136 (See FIG. 6), couples the control rod 140 to the torque tube 34, one for each the A half 44 and B half 46. The override mechanism allows the control rod in either half to override jams in its half, should a jam occur. It will be understood that the override mechanism may be either linear or rotary in nature. Thus either piston 64 or 94 may move the common actuator 53 and actuate the rudder 14 independently of the other piston.

In prior art systems having multiple actuators to control a particular control surface, force fight has been known to develop between the multiple actuators. These force fights impose large forces on the components in the system and if not compensated for may fatigue these components. The force fights develop because the different tolerances of the multiple actuators will generally cause the actuators to have slightly different positions. Moreover, because the actuators couple to each other via the controlled surface, the force fight is proportional to the stiffness of the surface controlled by the multiple actuators. Thus compliance or stiffness of the control surface allows the multiple actuators to assume somewhat different positions. A stiff surface will cause high force fight. A more pliable surface will result in lower force fight.

The present invention provides mechanisms to alleviate force fight between the pistons 64 and 94 in the dual tandem actuator. Instead of using the comparative pliability of a control surface, the present invention employs the orifices 138 and 168 to negate the force differences between the pistons. Thus, the orifices 138 and 168 emulate the comparative pliability of the control surface by providing a relief path for the potentially different pressures and flow rates in the two pistons 64 and 94 which might occur during a force fight.

Moreover, in accordance with the principles of the present invention, the orifice is sized to accommodate both the force fight and to provide system damping. To correctly size the orifice 138 to provide stability and to relieve force fight, three conditions should be satisfied. First the equivalent orifice diameter of orifice 138 should exceed that diameter required to provide adequate damping and thus unconditional system stability. Second, the equivalent orifice diameter should allow the control system to still meet the performance requirements of the aircraft. In other words, the size of the orifice 138 ensures that frequency response or bandwidth and the actuator dynamic stiffness requirements are met.

Third, the equivalent orifice diameter should relieve enough load pressure to lower the fight force to within acceptable limits. Thus, by iterating the control valve 62 equivalent orifice diameter, the area of the piston 64, and the diameter of the orifice 138, the principles of the present invention create a "window" of solutions encompassing these variables which provides satisfactory system stability, accommodates force fight, and meets performance requirements. Otherwise, by iterating only two of the three variables the design of the control system would have a single mathematical solution. While a system could be designed to that single solution, systems designed by iterating all three criteria will be easier to rig, operate and maintain. Thus, the present invention provides a range of practical designs for the control system.

Figures 11, 12:
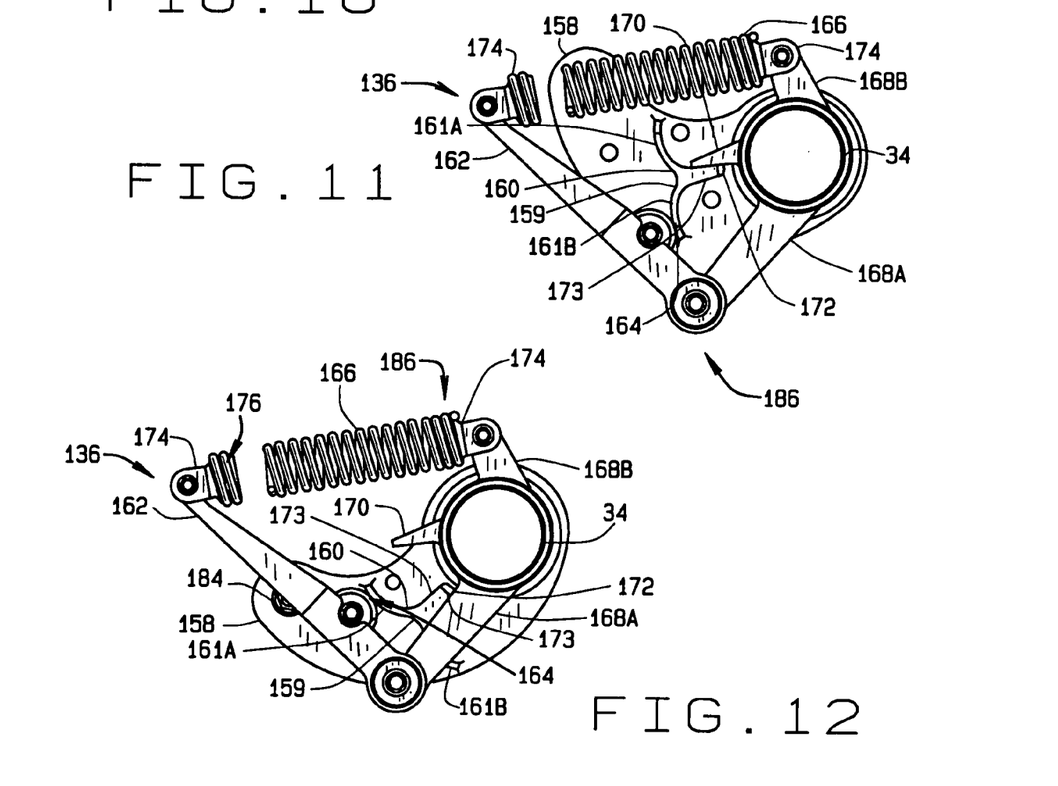
FIG. 11 is a bottom plan view of the override mechanism of FIG. 12 showing an override condition.
FIG. 12 is a bottom plan view of the override mechanism of FIG. 12 showing an override condition.

Turning now to the override mechanism 136, during normal operation the override mechanism 136 is sufficiently stiff such that the control rods 140 and 142 tend to move in unison to input commands to the simplex control valves 62 and 92. However, should an input jam occur in the input linkage of the A half 44, the override mechanism 136 of the A half 44 operates to override the jammed A half 44 thereby allowing the un-jammed B half 46 to arrest a hardover of the rudder 14. With reference to FIG. 11, the override mechanism 136 includes the following components: an output crank arm 158, a cam 160, a cam follower arm 162, a cam roller 164, a tension spring 166, a pair of arms 168A and 168B, a pair of travel limiters 170 and 172, a pair of spring attachments 174, and a control rod 140. Additionally, the cam 160 includes an indent, or valley, 159 and a pair of generally curved ramps 161A and 161B.

In normal operation, as noted previously, the torque tube 34 receives commands from the pedals 28, the input cable 30 and linkage 32. Those commands are transmitted to the control rod 140 as described herein and illustrated by FIG. 10 to 12. The spring 166 preloads the roller 164 against the indent, or valley, 159 of the cam 160 via a four sided mechanism 186 including the spring 166, the pair of arms 168A and 168B, and the cam follower arm 162. In normal operation, very little force is required to drive the control rod 140 and thus command the power control unit. With this normally small force required to move the control rod 140, the preload firmly holds the roller 164 against the valley 159 of the cam 160 throughout full travel. The preload is generally directed into the center of the indent 159. Thus the preload is balanced between the two ramps 161A and 161B at the indent 159. Note that, a preload setting device may be included on the four member mechanism 186 to adjust the preload.

When the input torque tube 34 and four sided mechanism 186 rotate in response to a command, the four sided mechanism 186 pushes the cam roller 164 against one ramp 161A or the other ramp 161B depending on the direction of the rotation (i.e. the command). Thus a slight force imbalance develops with the cam roller 164 exerting a net force against a ramp 161A or 161B of the cam 160. Since the cam is rigidly attached to the crank arm 158, the crank arm 158 accordingly rotates about the input torque tube 34. At the control rod connector 184 of the crank arm 158, the crank arm 158 thus moves the control rod 140 in the commanded direction.

Should a off-center valve jam occur in the A half 44, the A half of the power control unit will attempt to drive the rudder hardover. In this situation, the control rod 140 may develop a force tending to back-drive the command at the control rod connecter 184, thereby back-driving the input torque tube 34, through the crank arm 158 and the override mechanism 136. Back-drive of input torque tube 34 causes the B half 46 of the power control unit to follow the A half 44 of the power control unit and both sides combine to drive the rudder hardover. Assuming no input is being made to the system by the pilots, the feel and centering unit 36 resists the movement of the input torque tube 34 and attempts to maintain the system a neutral or zero rudder. As the rudder begins to travel hardover, the feel unit displaces requiring a proportionally larger force from the control rod 140 to continue to drive the rudder. The override mechanism will "breakout" at the point where the force from the control rod 140 matches the resistive force from the feel and centering unit.

At the point the override mechanism breaks-out, the rudder will cease traveling hardover and will maintain the displaced position. Within the override mechanism, the force being transmitted through the mechanism between the input control rod 140 and input torque tube 34 attempts to roll the cam roller up one of the ramps 161A or 161B. Due to the preload on the cam roller 164 from spring 166, the roller will remain in the valley of the cam until the force attempting to drive the roller up the ramp exceeds the preload force on the roller from spring 166. At the point where breakout occurs, the cam roller 164 will ride up one of the ramps 161A or 161B in the direction which the connector rod 140 may be attempting to back-drive the crank arm 158. As the back-driving force increases, the cam roller 164 rides further out on the ramp 161 thereby changing the length of the spring 166.

In this manner, the override mechanism 136 may override the jammed A half 44 in this scenario. In the mean time, the B half 46 override mechanism 137 is operating normally (without a back-driving force from the un-jammed B half 46) and transmitting commands from the input torque tube 34 to the B half 46 of the main power control unit.

In a preferred embodiment of the present invention includes the pair of travel limiters 170 and 172. FIG. 11 shows travel limiter 170 engaging a stem 173 of the cam 172 thereby preventing the cam roller 164 from rolling off of one end of the cam 160 when the override mechanism 136 is in a trailing edge right override condition. Likewise, FIG. 13 shows travel limiter 172 (which projects about perpendicularly from the cam stem 173) engaging arm 168A to prevent the cam roller 164 from rolling off the cam 160 in a trailing edge left override condition. The preload on the cam roller 164 from spring 166 is set to a value that will match the force generated by the feel and centering unit at a desired rudder position. Therefore, in the event of an off-center valve jam, rudder travel will be limited to a chosen low displacement rather than to a full hardover displacement. In another preferred embodiment of the present invention, the override mechanism limits the rudder to a deflection of about 3 degrees of rudder for off-center valve jam scenarios.

In addition, a preferred embodiment includes a spring attachment 174 as show in exploded view in FIGS. 11 and 12 at the left end of the spring. The spring attachment includes a threaded fitting 176 on to which the spring 166 is threaded. Once threaded onto the threaded fitting 176, the spring 166 may be secondarily retained to the spring attachment 174 by mechanical deformation, tack welding, brazing, adhesive, or other reliable means of permanently securing the spring 166 to the spring attachment 174. One spring attachment 174 is used for each end of the spring 166 to assemble the spring into the four sided mechanism 186. It has been found that the threaded fitting 176 of the spring attachment 174 provides a compact installation envelope as well as a superior fatigue resistance as compared to the conventional hook type spring attachments.

Turning now to the delta pressure sensor 68, the delta pressure sensor 68 is connected across the piston 64 and senses both the extend and retract pressures being applied to the piston 64. If the A half control valve 62 and the B half control valve 92 are providing the same pressure commands to the pistons 64 an 94, the delta pressure across each piston will be approximately the same. The delta-delta pressure will therefore be relatively small.

Should an input jam occur in either the A half 44 or the B half 46 reliable redundancy requires detection of the jam. Regardless of the cause of the input jam, at the point of breakout of the override mechanism 136, one piston 64 or 94 will have high hydraulic pressure ported to it by the jammed control valve 62 or 92 respectively, while the other piston 94 or 64 will be resisting that hardover motion with equal hydraulic pressure in the opposite direction. Thus one piston will attempt to move hardover, but will be resisted by the other piston and via the couplings within the dual tandem piston rod. Accordingly, a delta pressure will develop across the affected piston, and an opposing delta pressure will develop across the other piston.

By comparing the two delta pressure values, the jam will be detected in these scenarios. Thus, in accordance with a preferred embodiment of the present invention, the control system 26 includes a comparator 116 connected to the delta pressure sensors 68 and 98 to sense such failures. This comparator is referred to as a delta-delta pressure sensor. In a preferred embodiment, a pre-determined threshold may be used to indicate the anomaly. Note that the A half and B half delta pressure sensors may be included within the housing of the power control unit 42 or they may be external to the power control unit 42.

Figure 7:
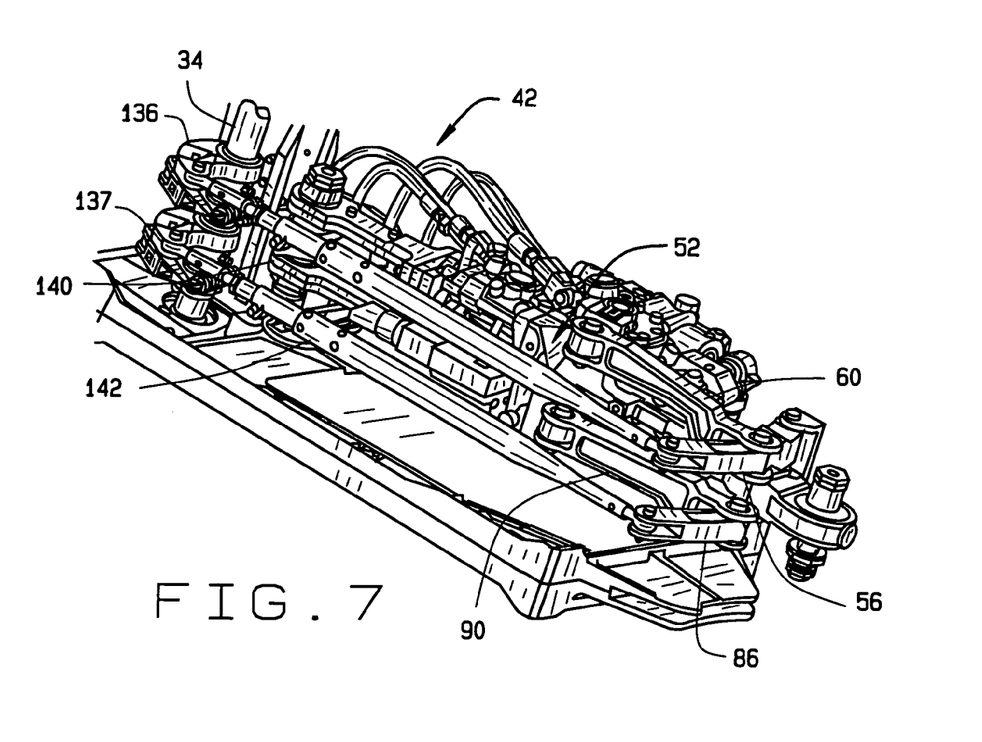
FIG. 7 is a perspective view of a power control unit in accordance with a preferred embodiment of the present invention.
Figure 8:
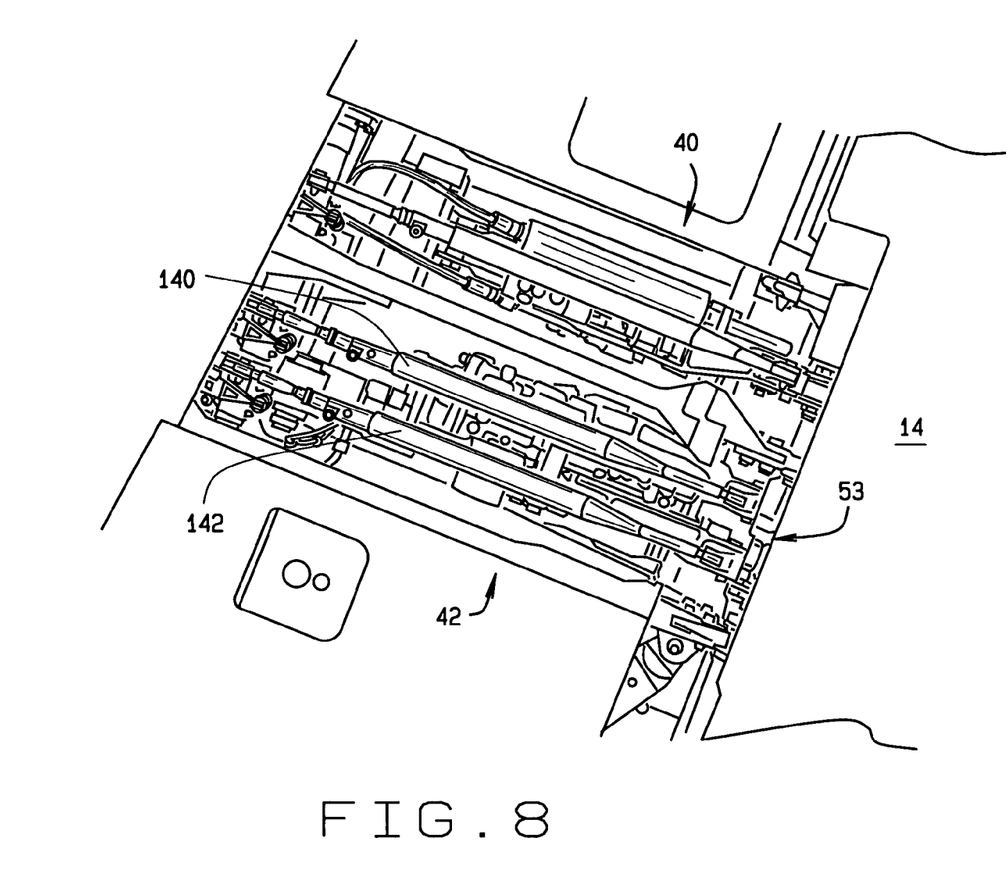
FIG. 8 is a side view of the power control unit of FIG. 5 installed in the aircraft of FIG. 1.

Turning now to FIG. 7 the main power control unit 42 may be seen in perspective view. The torque tube 34 allows the single load path cable 30 to command the main power control unit 42. In particular, the torque tube 34 transfers the commands from the single load path cable 30 and linkage 32 to the independent external summing levers 56 and 86 (via independent control rods 140 and 142 and the override mechanisms 136 and 137). Via the internal summing levers 60 and 90 the commands operate on the proportional control valves 62 and 92 (not visible in FIG. 7). Also, movement of the control valves 62 and 92 moves the common actuator 53 as previously described. Likewise, FIG. 8 shows a side view of the power control unit 42 and the standby power control unit 40 installed in the aircraft 10 with a service panel removed from the tail 12. In particular, the common actuator 53 is shown connected to the rudder 14.

Turning now to the load limiter 70 of FIGS. 4 to 5, should a movement of the common actuator 53 and rudder 14 occur, the load limiter 70 and 100 may mitigate the effects thereof. In the absence of the load limiter 70, the maximum deflection of the rudder is determined by the blowdown phenomenon. Blowdown occurs when the external air load on the rudder 14 balances with the control forces (hydraulic and crew input forces) on the rudder. Since the external air load increases as the rudder deflection increases, blowdown defines the maximum deflection a rudder may reach given the available control forces. Accordingly, limiting the hydraulic pressure available across the pistons 64 and/or 94 reduces the rudder deflection at which blowdown would occur.

Thus, in a preferred embodiment of the present invention, the load limiter 70 and 100 is a double acting, pilot operated valve as shown in FIGS. 4 to 5. It has three positions and is spring centered. In the centered or default position, no relief is provided across the piston 64. Thus, in the center position the load limiter 70 allows full hydraulic load pressure to be applied across piston 64. When load limiting is selected and when high (normal operating) pressure is applied to the left side of piston 64, the high pressure communicates to a pilot valve or lock piston (shown on the top of load limiter 70 in FIG. 5). In the top position, relief is provided through the load limiter 70 from the extend side of piston 64 to the retract side of piston 64.

The amount of relief and the corresponding reduction in pressure is determined by the equivalent orifice size of the load limiter 70 and the interconnecting tubing. In a preferred embodiment of the present invention, the pressure reduction provided is approximately ⅓ of the high pressure supplied by the hydraulic source 74. The pressure reduction yields a hydraulic pressure of approximately 1450 psi to the high pressure side of the piston 64. Similarly, the bottom position of the load limiter 70 provides relief retract side of piston 64 to the extend side of piston 64.

Referring still to FIG. 3, the position of the load limiter solenoid valve 72 determines whether the load limiter 70 is allowed to provide relief or remains in its spring centered position. The load limiter solenoid valve 72 is a solenoid operated valve which is spring loaded to allow the low pressure side of the load limiter pilot valves to drain to the hydraulic return. When commanded, the load limiter solenoid valve 72 allows the low pressure side of the load limiter pilot(s) to communicate with the high pressure hydraulic source 74. Thus, when commanded, the load limiter solenoid valve locks up the load limiter 70 in its center, no relief position.

During certain phases of flight, such as cruise, it is unlikely that full command authority will be required. Here, of course, command authority refers to the ability of the control system to generate a hinge moment to move the rudder. Accordingly, in preferred embodiments, the load limiter solenoid valve 72 may be commanded to allow load limiting as needed as a function altitude, airspeed, or other parameters.

The hydraulic pressure source 74 shown in FIGS. 4 to 6 communicates with the discharge of one of the onboard hydraulic pumps (not shown). In contrast, the hydraulic return 76 communicates with the low pressure reservoir and inlet to the same hydraulic pump. Note that to maintain redundancy between A half 44 and B half 46, the hydraulic source 74 and return 76 should not communicate with the same pump as the B half 46 hydraulic source 104 and return 106. The hydraulic fluid filter 78 serves to filter particulate contaminants out of the hydraulic fluid.

Next, the inlet check valve 80 serves to isolate the A half 44 hydraulic system from the rest of the system. The check valve 80 prevent hydraulic fluid from exiting the unit when the hydraulic system is not pressurized, which is typically while parked on the ground. Retention of the hydraulic fluid keeps the components within the unit in good working order, and allows for gust damping of the control surface if necessary. The check valve 80 may also be of any conventional type well known in the art.

Because there may be times when it is desired to bypass the power control unit 42, a preferred embodiment of the present invention also provides a bypass valve 82 as shown in FIGS. 4 to 5. The bypass valve 82 is a pilot operated valve which senses the pressure from the hydraulic source 74.

When the pilot valve senses high pressure it moves the bypass valve 82 to its operational position. In that position, the bypass valve 82 allows high pressure fluid from the hydraulic source 74 into the A half 44 hydraulic system. It also allows fluid flow to and from the power control unit 42 and the load limiter 70.

In a preferred embodiment, the bypass valve 82 operational position includes the tuned orifice 138 (see FIGS. 4 and 5). The bypass valve 82 is also spring loaded to move to the "bypass" position. In the bypass position, the high pressure hydraulic source 74 is isolated from the A half 44 of the power control unit. Additionally, the extend and retract sides of the piston 64 are connected in fluid communication so that piston 64 may move without opposition from the hydraulic fluid. Thus, if the common actuator 53 moves, moving piston 64 with it, no pressure builds on either side of the piston 64.

Either of the halves 44 or 46 may include an internal series electro-mechanical input. In the case of the rudder, the internal series electro-mechanical input is a yaw damper actuator 120, yaw damper servo valve 122, a yaw damper solenoid valve 124, and yaw damper LVDT 126. These components, shown in FIGS. 5 and 6, are provided to damp yaw/roll oscillations known as Dutch Roll. Since the yaw damper actuator 120 is connected to the rudder 14 in series with the power control unit 42, the yaw damper does not impact the operation of the power control unit 42 by the pilot. Relief valves 128 and 130 (shown in FIG. 4) may also be provided across the yaw damper actuator 120. The relief valves 128 and 130 open in the event the pilot attempts to back drive the yaw damper actuator 120. This Dutch Roll damping subsystem may be either included or omitted from one or both halves 44 and 46 without departing from the spirit and scope of the present invention.

Next, the power control unit summing lever 60 serves to input the rudder pedal 28 commands to the control valve 62. In turn, the control valve 62 controls the flow of hydraulic fluid to the piston 64 to move the rudder 14 in the commanded direction. The control valve 62 ports high pressure hydraulic fluid to the piston 64 in proportion to the command given to the power control unit.

Referring to FIG. 3 again, it can be seen that the two full flow positions are on opposite ends of the proportioning control valve 62, with the no flow position being in the center. Thus, the proportioning control valve 62 is spring biased to the full retract position. The force provided by the bias spring removes any lost motion or backlash from the linkage connected to and controlling the valve. As a new rudder command reaches the proportioning control valve 62 the valve moves from its initial no flow position proportionally toward the full flow position corresponding to the direction the rudder 14 is being commanded to move. When the rudder 14 moves to the commanded position the power control summing lever 60 urges the control valve 62 back to its no flow position. Thus the rudder 14 stops in its commanded position.

Since the external summing lever 56 is coupled to the internal summing lever 60, a movement of the rudder pedal 28 will also cause the internal summing lever 60 to input the command to the proportioning control valve 62. Normally, when the command is not changing and the rudder is in the commanded position, the proportioning control valve 62 will be in its center, or no flow, position.

Having described the components of the A half 44 in isolation, the system operation may now be described. Starting from the origination of the command, the pilot commands the rudder 14 by moving the rudder pedals 28. The rudder pedals 28 move the single load path cable 30 which in turn commands the rudder aft cable quadrant 32 and torque tube 34. The torque tube 34 then transmits the command to the external summing lever 56 via the control rod 140. Thus an input to the A half 44 of the main power control unit 42 is made. Preferably, the mechanical subsystem 24 may include one or more override mechanisms 136.

Now with reference to FIG. 5, a portion 148 of the mechanical subsystem 24 may be seen. While shown as existing outside of the unitary housing 52 (for convenience), some, or all, of the portion 148 of the mechanical subsystem may advantageously be housed within the unitary housing 52. Particularly, the external cranks 150 and 152 may remain outside of the unitary housing 52 while the transition links 144 and 146 penetrate the unitary housing 52. The transition links 144 and 146 thus carry the command into the unitary housing where they impart the command to internal cranks 154 and 156. In turn the internal cranks 154 and 156 impart the command to the internal summing levers 60 and 90.

Additionally, pairs of manifold stops 58 and 88 limit the travel of the internal cranks 154 and 156. The manifold stops are coupled to inside surfaces of the unitary housing 52 rather than the internal cranks 154 and 156. Moreover, the distance between the individual manifold stops of each pair 58 and 88 limit the range of motion of the internal cranks 144 and 146. Accordingly, the manifold stops represent hard stops which limit the allowed range of the commands input via the external summing levers 56 and 86. Thus, the command source may not command an excessive movement rate of the rudder 14. Moreover, because the manifold stops 58 and 88 and internal cranks 154 and 156 are internal to the unitary housing 52, these components are not subject to jam from foreign objects or from ice accumulation. Additionally, a shield between the A half 44 and B half 46 internal cranks and manifold stops may preclude a single foreign object from jamming both internal cranks 154 and 156. It should be noted that FIG. 6 shows the manifold stops 58 and 88 in relationship to the internal cranks 154 and 156 as they reside inside the unitary housing.

It will be appreciated by those skilled in the art that the power control unit utilizes a mechanical feedback loop. In particular, the external summing lever 56 accepts an input command from the pilot and a feedback position from the piston rod and outputs an error signal (a movement of the proportioning control valve 82) which is proportional to the error between the command and the feedback positions. The proportional error signal becomes the input command to the proportioning control valve 62. The combination of the proportioning control valve 62 and the dual (the dual tandem actuator 134) serve as the actuator which changes the output to match the input signal.

Having now described the operation of only one half 44, first system 26, the combined operation of the two systems will be described. Referring yet again to FIG. 4 to 6, both control rods 140 and 142 will move in unison in port hydraulic pressure to the pistons via the proportioning control valves 62 and 92. Accordingly, the pistons 64 and 94 provide the pilot with twice the assistance in moving the rudder 14 than one piston acting alone would.

However, should an input jam occur (e.g. a jam of the control valve) in the A half 44 of the power control unit, the control system 26 would operate as follows. First, the hydraulic pressure acting on the A half piston 64, will attempt to move that piston 64, the actuator rod 66, and the rudder 14, hardover. This piston movement will make an input to the external summing lever 56, which will result in the A half input rod 140 back-driving the input quadrant 34, through the override mechanism 136. The motion of the input quadrant 34 will result in the B half 46 of the power control unit receiving a command to follow the failed A half 44. This hardover motion will continue until the override mechanism for the A half breaks-out.

At the point of breakout, the command to the B half 46 will be interrupted causing the B half to hold position. Because the pistons 64 and 94 are coupled via the dual tandem actuator 54, piston 94 will attempt to force piston 94 to move (or move at the same velocity). At the same time of override break-out, an opposing pressure difference will build up across both pistons 64 and 94. This pressure difference will arrest further travel of the rudder 14, thereby limiting the effect of the input jam.

In addition to the mechanical limiting by the override mechanism described above, the delta pressure sensors across each piston will detect the load pressure across each piston 64, 94. Both delta pressures are fed to the comparator 116. By comparing the delta pressures across the pistons 64 and 94, the comparator 116 detects the larger than normal variation in delta-delta pressure values. The delta-delta pressure comparator 116 then annunciates the anomaly, and automatically activates the standby hydraulic system and standby power control unit, thereby providing the detection necessary for a reliably redundant system. Activation of the standby system allows continued normal control of the rudder, even in the presence of the input jam in the A half 44.

In addition, the standby system power control unit 40 has an actuator connected to the rudder 14 which is independent from the main power control unit 42 and which has a jam override mechanism incorporated therein also. Accordingly, the standby power control unit 40 may control the rudder 14 even with both A half 44 and B half 46 inoperative.

Figure 9:
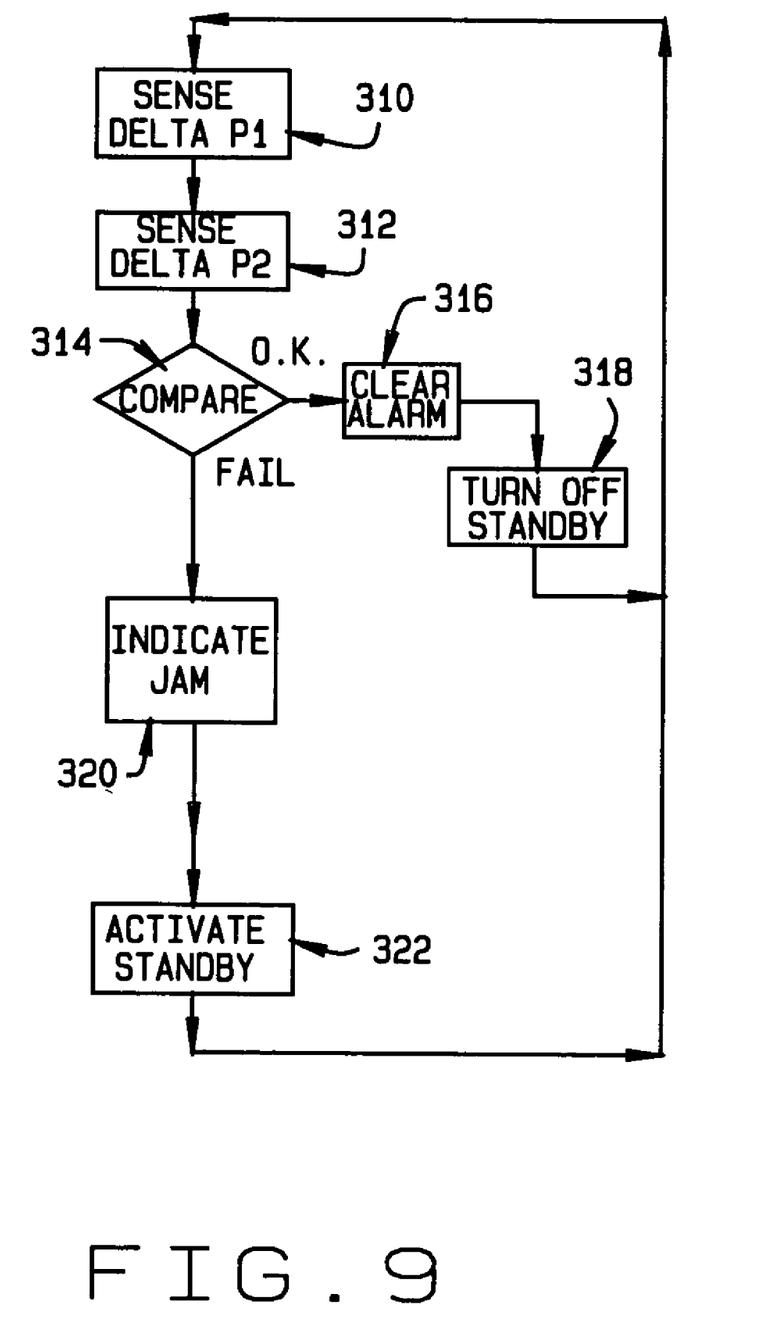
FIG. 9 is a flowchart of a monitoring method in accordance with a preferred embodiment of the present invention.

In the meantime the delta-delta pressure comparator monitors the control system in a method illustrated in FIG. 9. The pressure across the A piston is sensed by the A pressure sensor. See step 310. At the same time, the pressure across the B piston is sensed in step 312. The two delta pressures are compared in step 314. If they vary significantly then an annunciation is generated that one of the halves may be jammed in step 320. Additionally, the standby system may be activated as in step 322.

Figure 10:
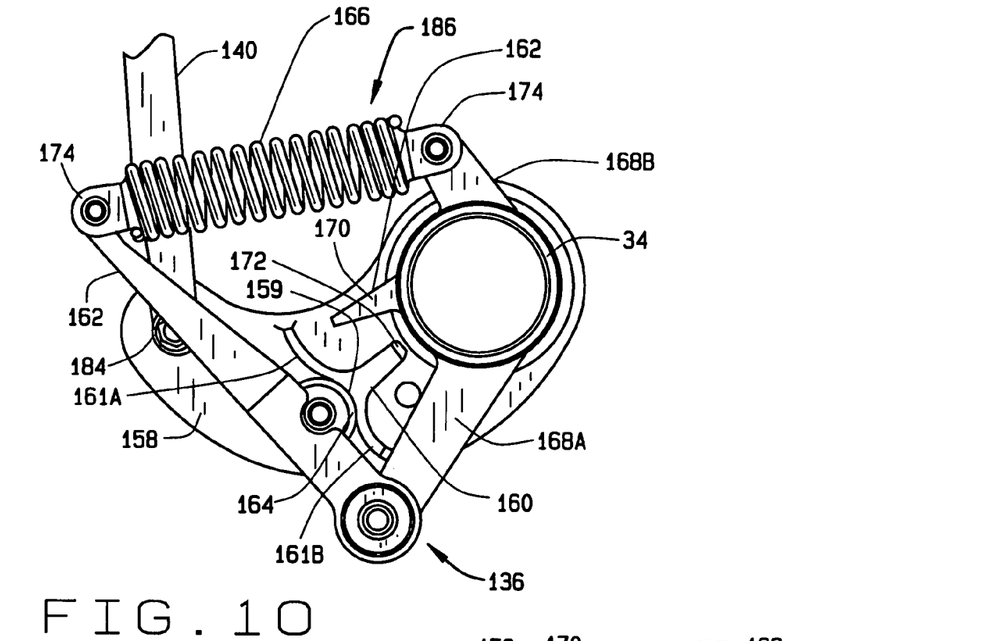
FIG. 10 is a bottom plan view of an override mechanism in accordance with a preferred embodiment of the present invention.

At any time, if the piston begins moving according to the command, then the annunciation may be cleared in step 316. Accordingly, monitoring of the delta pressures may continue as in steps 310, 312, and 314 as indicated in FIG. 10. Note that once the piston begins moving, and the annunciation clears, the standby system may be turned off in step 318. Doing so will save power and fuel. In the alternative, the standby system may remain on.

From the foregoing description it will be appreciated that the present invention provides a reliably redundant flight control system which provides the pilots with an instinctive means for the pilots to control the control surface in the scenarios described herein. Moreover, the present invention provides a weight savings over that of the prior art systems because of the weight efficiency of the unitary housing. The present invention also provides a fuel savings by allowing the standby system to operate only at selected times.

Also, by utilizing much of the existing control system (e.g. the rudder linkage) the present invention provides for aircraft retrofits with minimal recertification and minimal impacts on existing structure and operations. The present invention also employs embodiments with low technical risk retrofits while retaining control system functionality as measured by rates, travel ranges, hinge moments and yaw damper operation and performance. Accordingly, there will be no change to structural loads or flutter characteristics as a result of retrofitting affected aircraft with the present invention.

The description of the invention is merely exemplary in nature and, thus, variations that do not depart from the gist of the invention are intended to be within the scope of the invention. Such variations are not to be regarded as a departure from the spirit and scope of the invention.

What is claimed is:

1. A power control unit for an aircraft, the aircraft to include a control surface and a command path, the power control unit comprising:
   an override mechanism coupled to the control path;
   a first control member coupled to the override mechanism whereby the override mechanism transfers a control command from the command path to the first control member;
   a second control member coupled to the control path whereby the command path transfers the control command to the second control member;
   a first and a second actuator member coupled to the first and the second control members respectively such that the first and second control members respectively attempt to move to the first and second actuator members in response to the control command, whereby the override mechanism allows the second control member to move the second actuator member when the first control member resists moving in response to the control command;
   an actuator including a first piston coupled to the first actuator member and a second piston coupled to the second actuator member and adapted to be coupled to the control surface, whereby the actuator moves the control surface in response to the command;
   a housing containing the first and the second pistons;
   a first pressure sensor connected across the first piston to electronically sense a first delta pressure across the first piston;
   a second pressure sensor connected across the second piston to electronically sense a second delta pressure across the second piston; and
   a comparator adapted to electronically compare the first and second delta pressures and activate a standby actuator when the difference between the first and the second delta pressures exceeds a predetermined threshold indicative of the first control member resisting moving in response to the control command.

2. The power control unit according to claim 1, further comprising: a load relief valve in fluid communication with the first piston and adapted to control a restricted fluid communication path between an extend side and a retract side of the first piston.

3. The power control unit according to claim 1, further comprising:
   an orifice in fluid communication with the extend and retract sides of the first piston, whereby the orifice is adapted to bleed pressurized fluid across the first piston to alleviate force fight between the first and second pistons and to provide damping of the pressure across the first piston.

4. The power control unit according to claim 1, wherein the control surface comprises a rudder.

5. The power control unit according to claim 1, the override mechanism further including a spring which changes length when the first actuator member resists moving in response to the control command.

6. An aircraft comprising:
a control surface;
a command path; and
a power control unit including an override mechanism adapted to be coupled to the control path;
a first control member coupled to the override mechanism whereby the override mechanism transfers a control command from the command path to the first control member;
a second control member coupled to the control path whereby the command path transfers the control command to the second control member;
a first and a second actuator member coupled to the first and the second control members respectively such that the first and second control members respectively attempt to move to the first and second actuator members in response to the control command, whereby the override mechanism allows the second control member to move the second actuator member when the first control member resists moving in response to the control command;
an actuator including a first piston coupled to the first actuator member and a second piston coupled to the second actuator member and adapted to be coupled to the control surface, whereby the actuator moves the control surface in response to the command;
a housing containing the first and the second pistons;
a first pressure sensor connected across the first piston to electronically sense a first delta pressure across the first piston;
a second pressure sensor connected across the second piston to electronically sense a second delta pressure across the second piston; and
a comparator adapted to electronically compare the first and second delta pressures and activate a standby actuator when the difference between the first and the second delta pressures exceeds a predetermined threshold indicative of the first control member resisting moving in response to the control command.

7. The aircraft according to claim 6, further comprising a load relief valve in fluid communication with the first piston and adapted to control a restricted fluid communication path between an extend side and a retract side of the first piston.

8. The aircraft according to claim 6, wherein the control surface comprises a rudder.

9. The aircraft according to claim 6, further comprising:
an orifice in fluid communication with the extend and retract sides of the first piston, whereby the orifice is adapted to bleed pressurized fluid across the first piston to alleviate force fight between the first and second pistons and to provide damping of the pressure across the first piston.

10. A method of controlling an aircraft, the aircraft to include a control surface, a command path, and a first and a second pressurized fluid source, the method comprising:
attempting to move a first piston with the first pressurized fluid source in response to a control command from the command path;
simultaneously attempting to move a second piston with the second pressurized fluid source in response to the control command, the first and second pistons housed within a common housing;
activating an override mechanism to move the second piston when the first piston resists movement;
electronically sensing a first delta pressure across the first piston;
electronically sensing a second delta pressure across the second piston;
comparing the first and second delta pressures to determine a delta differential pressure between the first and second delta pressures; and
activating a standby power control system when the delta differential exceeds a predetermined threshold.

11. The method according to claim 10, further comprising controlling a restricted fluid communication path between an extend side and a retract side of the first piston to alleviate force fight between the first and second pistons and to provide damping of the pressure across the first piston.

12. The method according to claim 10, wherein the control surface comprises a rudder.

* * * * *